United States Patent [19]

Inui et al.

[11] Patent Number: 5,128,922
[45] Date of Patent: Jul. 7, 1992

[54] OPTICAL DISK WITH GLASS SUBSTRATE AND METHOD OF PRODUCING SAME

[75] Inventors: Tetsuya Inui; Junji Hirokane; Akira Shibata; Yoshiyuki Nagahara; Kenji Ohta, all of Nara, Japan

[73] Assignee: Sharp Kabushiki Kaisha, Osaka, Japan

[21] Appl. No.: 687,769

[22] Filed: Apr. 18, 1991

Related U.S. Application Data

[63] Continuation of Ser. No. 237,871, Aug. 29, 1988, abandoned.

Foreign Application Priority Data

Sep. 29, 1987 [JP] Japan .................. 62-244744

[51] Int. Cl.$^5$ .......................... G11B 3/70; G11B 5/84; G11B 7/26; G01D 9/00
[52] U.S. Cl. .................................. 369/280; 369/284; 369/286; 369/275.5; 346/135.1
[58] Field of Search ............... 369/280, 282, 283, 284, 369/286, 72, 272, 277, 275.5; 360/135; 51/281, 283, 284; 346/135.1, 137

[56] References Cited

U.S. PATENT DOCUMENTS

| 3,673,746 | 7/1972 | Highberg ........................ 51/283 X |
| 4,546,464 | 10/1985 | Inoue et al. ...................... 369/286 X |
| 4,678,547 | 7/1987 | Miyamoto et al. .............. 369/288 X |
| 4,802,160 | 1/1989 | Yamada et al. ................. 369/272 X |

FOREIGN PATENT DOCUMENTS 60-195751 10/1985 Japan .
60-197960 10/1985 Japan .

Primary Examiner—Stuart S. Levy
Assistant Examiner—Tien Ba Pham
Attorney, Agent, or Firm—Morrison & Foerster

[57] ABSTRACT

An optical disk with a substrate made of glass at least partially has its inner and outer peripheral surfaces polished to surface roughness of 5 μm or less so as to reduce the amount of glass powder generated from these surfaces and to thereby improve the yield.

2 Claims, 4 Drawing Sheets

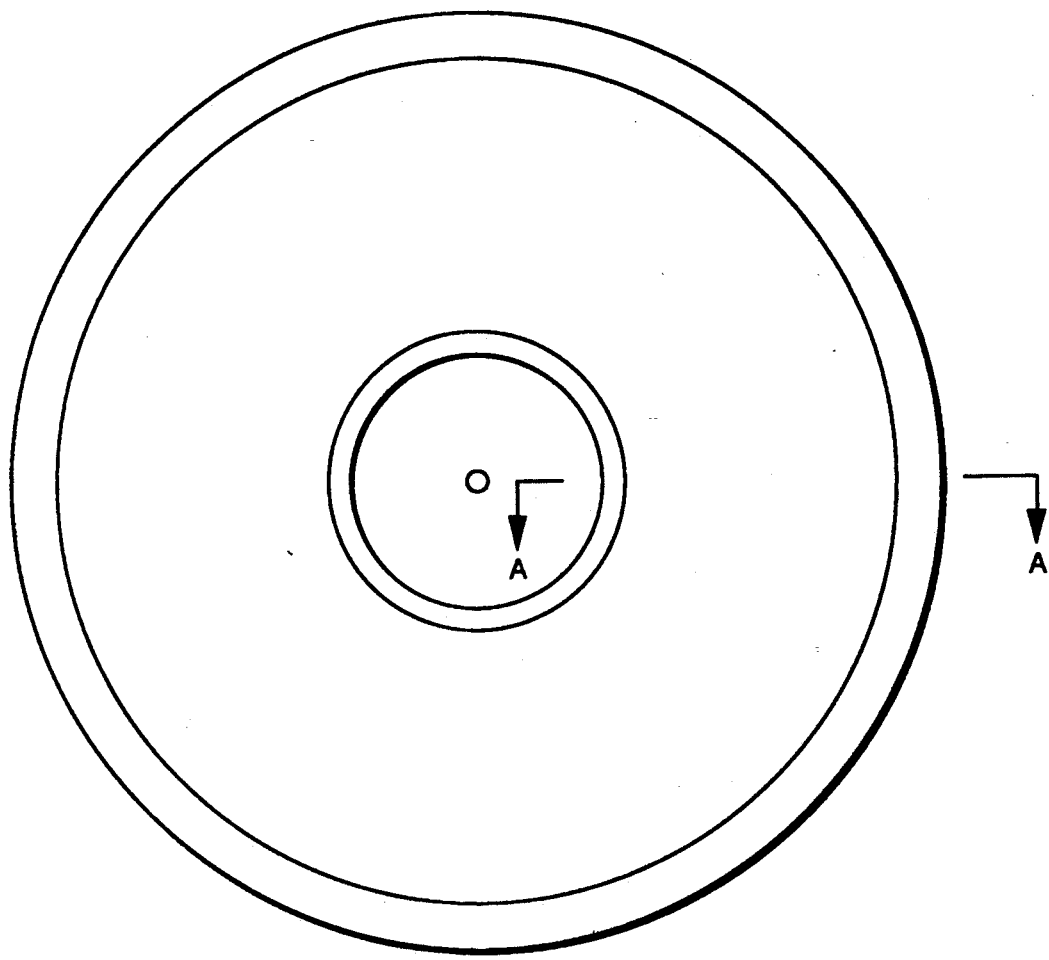
FIG._1A
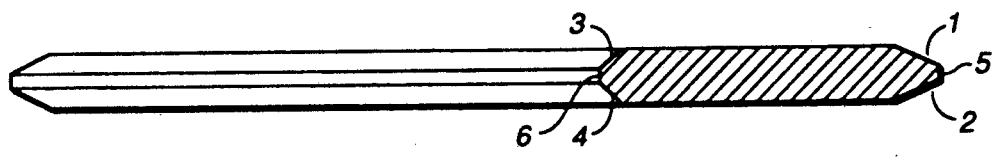
FIG._1B

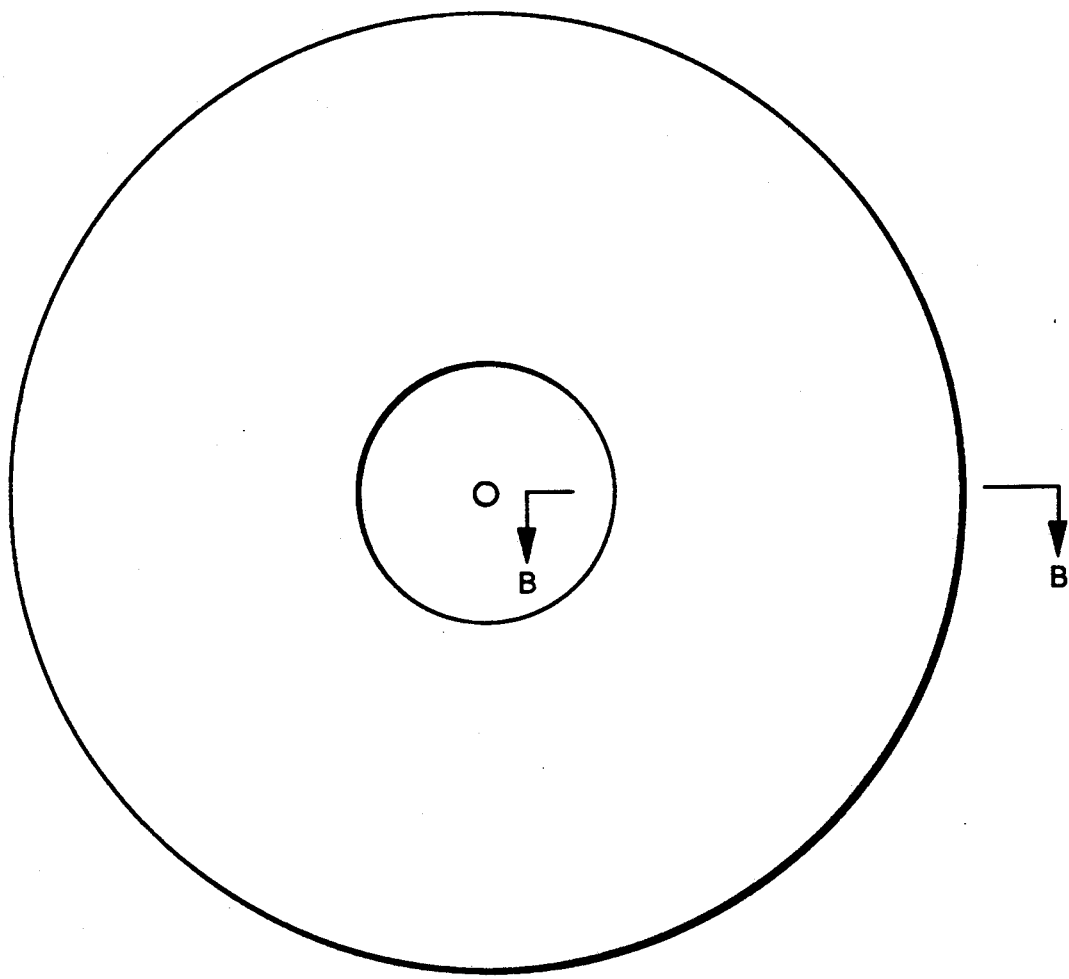
FIG._2A
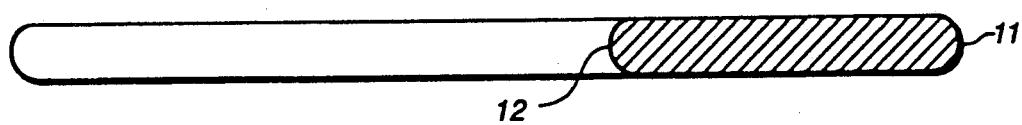
FIG._2B

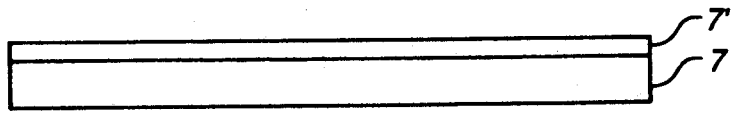
FIG._3A
*(PRIOR ART)*
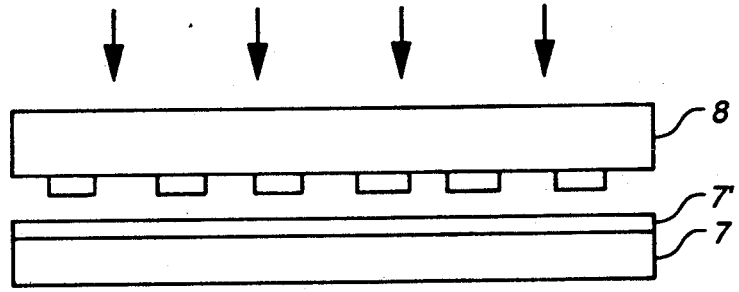
FIG._3B
*(PRIOR ART)*
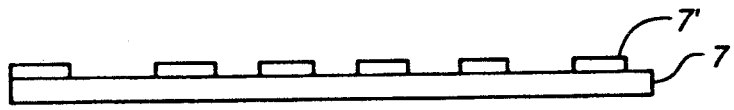
FIG._3C
*(PRIOR ART)*
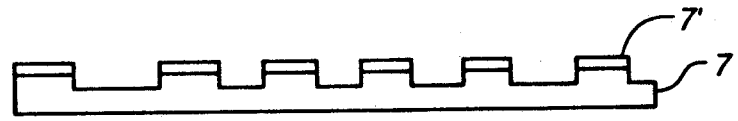
FIG._3D
*(PRIOR ART)*
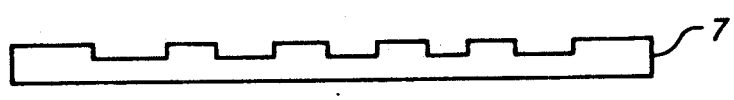
FIG._3E
*(PRIOR ART)*

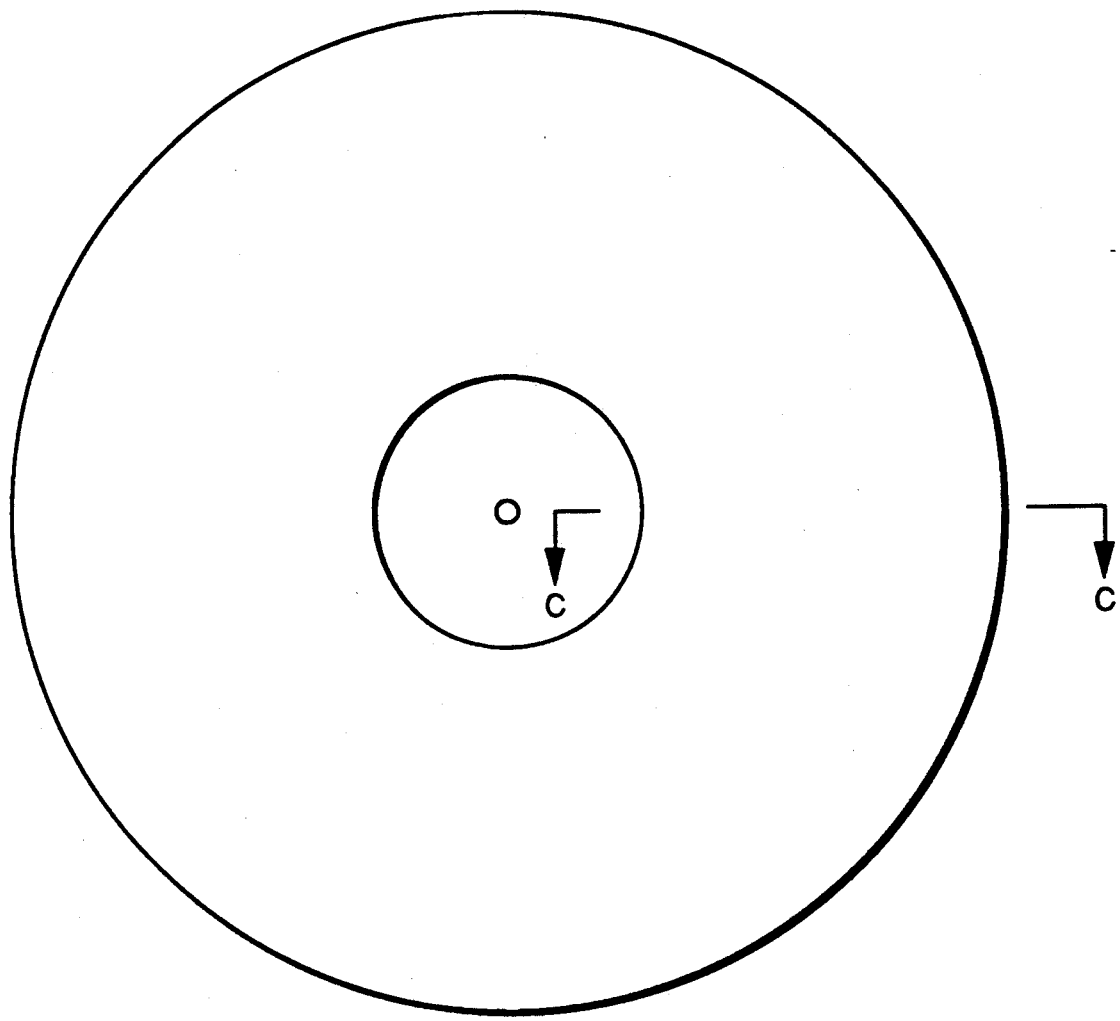
FIG._4A
(PRIOR ART)
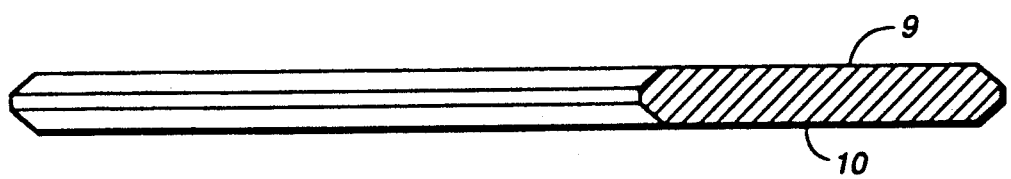
FIG._4B
(PRIOR ART)

OPTICAL DISK WITH GLASS SUBSTRATE AND METHOD OF PRODUCING SAME

This application is a continuation of application Ser. No. 07/237,871, filed Aug. 29, 1988 now abandoned.

BACKGROUND OF THE INVENTION

This invention relates to the structure of and a method of producing a disk-shaped optical memory medium or a so-called optical disk on which laser light can be used for recording, playback and erasing.

Recently, so-called optical disks on which light can be used for recording, playback and erasing are being developed rapidly. An optical disk typically comprises a disk-shaped substrate with grooves formed thereon somehow in the form of a spiral or concentric circles such that a finely focused light beam can follow such a groove to record signals therein. Such a grooved disk may be produced by injecting a polycarbonate resin or an acryl resin into a mold having desired indentations. On the other hand, a method of producing grooved glass substrates as shown in FIGS. 3A–3E has been disclosed in Japanese Patent Publications Tokkai 60-195751 and 60-197960 according to which a photomask 8 with a desired pattern (such as grooves and a pit pattern) formed thereon is attached to a glass disk 7 coated with photoresist 7' (FIG. 3A) and it is exposed to a beam of ultraviolet light from above (FIG. 3B). Thereafter, the resist is removed from the exposed areas by a development process (FIG. 3C) and the desired pattern is transferred onto the glass substrate by an etching process (FIG. 3D). A desired optical memory can be obtained by removing the resist therefrom (FIG. 3E) and a film with recording, playback and erasing functions (such as optomagnetic materials with perpendicular magnetization characteristics and phase-change materials with amorphous-crystalline phase change characteristics) is formed on the surface.

With reference to FIGS. 3A–3E, if contaminants such as dust particles are deposited between the mask 8 and glass substrate 7 when they are attached together, the product may become defective because if the contact between the mask 8 and the glass substrate 7 is imperfect, the desired grooves and pit patterns cannot be properly transferred. Among such contaminants that become deposited between the mask 8 and the glass substrate 7, there is frequently a large quantity of fine glass powder in addition to fibers and what may generally be referred to as dust. Such glass powder usually comes about because edges of the glass substrate 7 break off easily. In other words, glass powder cannot be eliminated no matter what care is taken to clean the environment and to reduce the amount of dust during the production process. In order to reduce the occurrence of defective products during the production process, therefore, it is essential to reduce the generation of glass powder.

SUMMARY OF THE INVENTION

It is therefore an object of the present invention to provide an optical disk with a glass substrate so structured that fine glass powder is not likely to be generated during its production process and a method of producing such an optical disk.

The present invention is based on the observation that generation of fine glass powder in the above context depends largely on the structure of the glass substrate. Conventionally, a glass substrate is polished as shown in FIGS. 4A and 4B on both surfaces 9 and 10 but its inner and outer peripheral surfaces are formed in desired shapes but not further polished. As a result, there remain fine protrusions and indentations on these surfaces. When the disk comes into contact with a carrier or positioning pins during its production process or when it is subjected to a thermal stress such as when the disk temperature is raised, mechanical force tends to be concentrated on such finely protruding and indented sections, breaking the glass material to produce fine powder. In view of the above, an optical disk embodying the present invention is characterized as having a glass substrate with its peripheral surfaces so processed that glass powder is not likely to be generated. Accordingly, a method embodying the present invention is characterized as including the step of removing the protrusions and indentations on the peripheral surfaces of the glass substrate With the peripheral surfaces smoothed, generation of glass powder can be inhibited.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIGS. 1A and 1B are a plan view of a glass substrate of an optical disk embodying the present invention and its sectional view taken along the line A—A of FIG. 1A, respectively, FIGS. 2A and 2B are a plan view of another glass substrate of an optical disk embodying the present invention and its sectional view taken along the line B—B of FIG. 2A, respectively, FIGS. 3A–3E show a series of steps in a conventional method of producing an optical disk, and FIGS. 4A and 4B are a plan view of a conventional glass substrate of an optical disk and its sectional view taken along the line C—C of FIG. 4A, respectively.

DETAILED DESCRIPTION OF THE INVENTION

FIGS. 1A and 1B show a glass substrate of an optical disk embodying the present invention characterized as having both its inner peripheral surface (numerals 3, 4 and 6 indicating portions thereof) and its outer peripheral surface (numerals 1, 2 and 5 indicating portions thereof polished as well as formed in desired shapes. For the polishing, use may be made of grindstone containing diamond or any appropriate abrasive powder for the purpose such as powder of cerium oxide. In the beginning, grindstone with a relatively large granular size is used for efficiency. Granular size is reduced gradually to reduce the surface unevenness. The present invention is characterized as carrying out this process still further to remove even the remaining unevenness. For this purpose, grindstone and abrasive powder of even smaller granular size may be used for polishing or alternatively a felt pad may be used together with grinding powder (or the so-called buffing). The former method is advantageous in that the shape of the peripheral surfaces can also be corrected because grindstone is used while the latter method can only serve to reduce the surface roughness. The degree of accuracy in shape required for the inner and outer peripheries can be achieved, however, by either of these methods.

FIGS. 2A and 2B show another optical disk embodying the present invention, characterized as having a semi-circular cross-sectional shape both along the outer and inner peripheries 11 and 12. In the case of the disk of FIGS. 1A and 1B, surfaces were formed first and then polished. The disk shown in FIGS. 2A and 2B is formed in a circular shape and then polished. To make it in a circular form, the disk is rotated and grindstone with a desired concave surface is pressed against it. After the disk is formed in a circular shape, grindstone with smaller granular size is used for removing fine protrusions and indentations. Alternatively, the buffing method may be used also in this case. The choice between the two methods is not critical to reduce the surface roughness on the peripheral surfaces to a degree desired for the purpose of this invention.

Surface roughness on the peripheral surfaces of a substrate is about 20–40 μm by a conventional method of polishing although it naturally depends on the exact choice of method. This is because roughness on the peripheral surfaces has not been believed to directly contribute to the disk characteristics and nobody thought of making these surfaces smoother. According to the present inventors, roughness on the peripheral surfaces affects the yield seriously and must therefore be reduced. Experiments were carried out to determine to what extent the surface roughness must be reduced and it was determined as a result that surface roughness should be reduced to 5 μm or less.

The foregoing description of preferred embodiments of the present invention has been presented for purposes of illustration and description. It is not intended to be exhaustive or to limit the invention to the precise form disclosed. For example, the present invention is applicable also to optical disks with a substrate which is made of glass only in part. Any modifications that may be apparent to a person skilled in the art are intended to be included with the scope of this invention.

What is claimed is:

1. An optical disc, comprising:
  a disk shaped substrate comprised of glass, the disc having a circular outer peripheral surface having a beveled edge, a circular hole centrally located in the disc, the hole being surrounded by an inner circular peripheral surface having a beveled edge, a first planar surface extending between the circular outer peripheral surface and a circular inner peripheral surface around the hole and a second planar surface opposite the first planar surface wherein the beveled edge of the outer peripheral surface and the inner peripheral surface each has a ground glass surface roughness of 5 μm or less.

2. A method of producing an optical disc, comprising the steps of:
  providing a disc shaped substrate comprised of glass, the disc having a circular outer peripheral surface, a circular hole centrally located in the disc, the hole being surrounded by an inner peripheral surface, a first planar surface extending between the circular outer peripheral surface and the inner peripheral surface around the hole and a second planar surface, opposite the first planar surface;
  forming a beveled edge on the outer and the inner peripheral surfaces;
  grinding the beveled edge on the inner and outer peripheral surfaces until each has a ground glass surface roughness of 5 μm or less;
  coating the first planar surface with a photoresist to provide a photoresist layer;
  contacting the photoresist layer with a photomask having openings therein; and
  exposing the photoresist layer to light through the openings of the photomask.

* * * * *